Feb. 8, 1927.
J. K. DARBY
1,616,785
LIQUID DISPENSING APPARATUS OR THE LIKE
Filed April 29, 1925     3 Sheets-Sheet 3
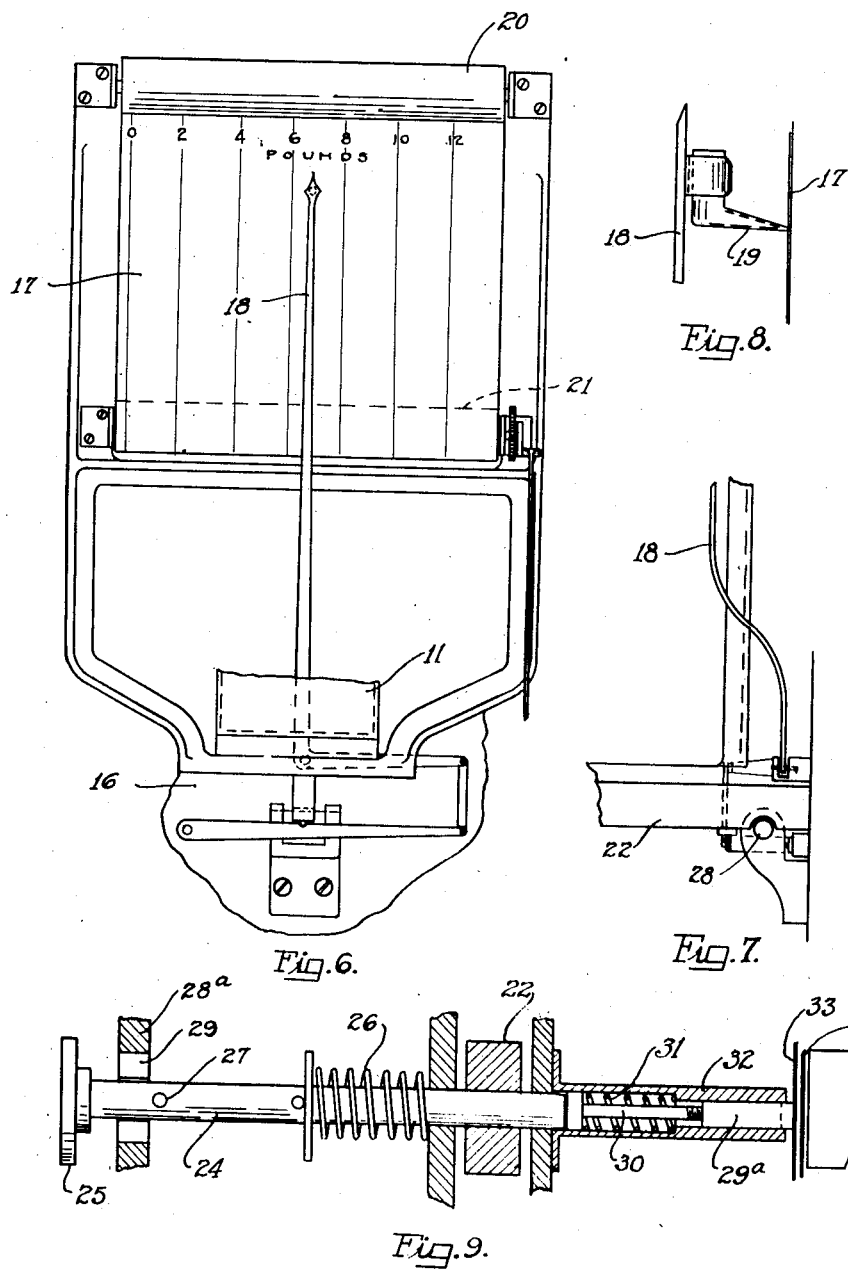

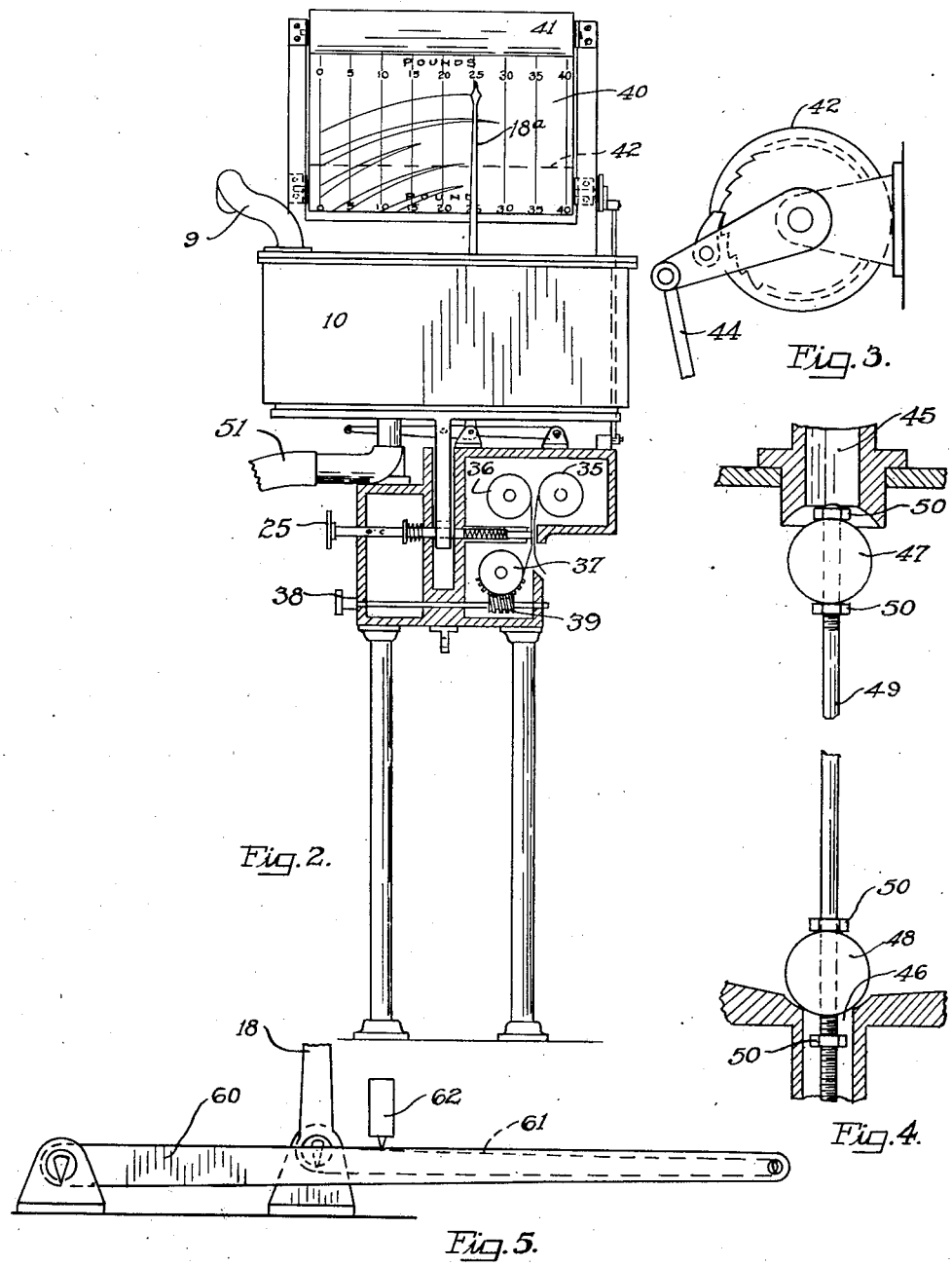

Patented Feb. 8, 1927.

1,616,785

UNITED STATES PATENT OFFICE.

JAMES K. DARBY, OF DAYTON, OHIO.

LIQUID-DISPENSING APPARATUS OR THE LIKE.

Application filed April 29, 1925. Serial No. 26,754.

This invention relates to liquid dispensing apparatus, having particular reference to a liquid dispensing pump of any suitable construction, as the conventional types of pumps commonly used at gasoline filling stations, and means for determining the weight or specific gravity of the liquid as the basis for supplying the same to the customer.

In view of the marked variations in the specific gravity of a highly volatile gaseous liquid as gasoline, the standard of measure—a gallon—by which the liquid is commonly dispensed to the public as also accordingly variable as to the fuel values, or heat units, contained to the gallon. Thus, gas at low volatility has a relatively higher percentage of heat units than gas at high volatility and therefore represents a higher cost to the dispenser but does not yield a higher fuel value to the purchaser, in view of the fact that carburetion of heavy gases is not as effective as of lighter or more volatile gases. Thus there is material loss to the dispenser of heavy gas without gain to the purchaser, the heavy gas below a certain point having even less fuel value than the light because of the less favorable carburetion condition of the gas.

The object attained in my invention is a suitable apparatus for dispensing liquid in which means are provided for regulating the density or specific gravity of the liquid, and for dispensing the liquid on a weight basis instead of a measure basis as in the present common practice.

To this end, my invention comprises means for regulating the temperature of the gas and means for weighing the gas to determine its specific gravity, and thus to provide a more definite basis of value for dispensing the gas to the purchaser, the means of control being effective to minimize fuel waste incident to dispensing gas too heavy for the best carburetion and to provide gas to the consumer maintained at a point of volatility best suited to the fueling of internal combustion motors.

Means are provided in a preferred form of the invention for recording the condition of the fuel on a record retained by the company, this feature being effective to insure that proper attention will be given by filling station attendants to the regulation of the apparatus to maintain the liquid at predetermined density.

The liquid dispensing apparatus, as shown in the accompanying drawings, serves to illustrate the underlying principle of the invention, it being understood that suitable modifications of the general arrangement and the detail mechanisms to meet variable conditions and regulation of the service are contemplated in the commercial use of the apparatus.

In the drawings:

Fig. 2 is an end elevation of the apparatus;

Fig. 3 is a detail of the registering mechanism;

Fig. 4 is a detail of an automatic valve for controlling delivery of the fuel;

Fig. 5 is a detail of the weighing mechanism;

Fig. 6 is a detail in elevation of the weighing mechanism;

Fig. 7 is a detail side view of Fig. 6;

Fig. 8 is a further detail of Fig. 6;

Fig. 9 is a detail of the controlling devices of the weighing mechanism.

Figure 1:
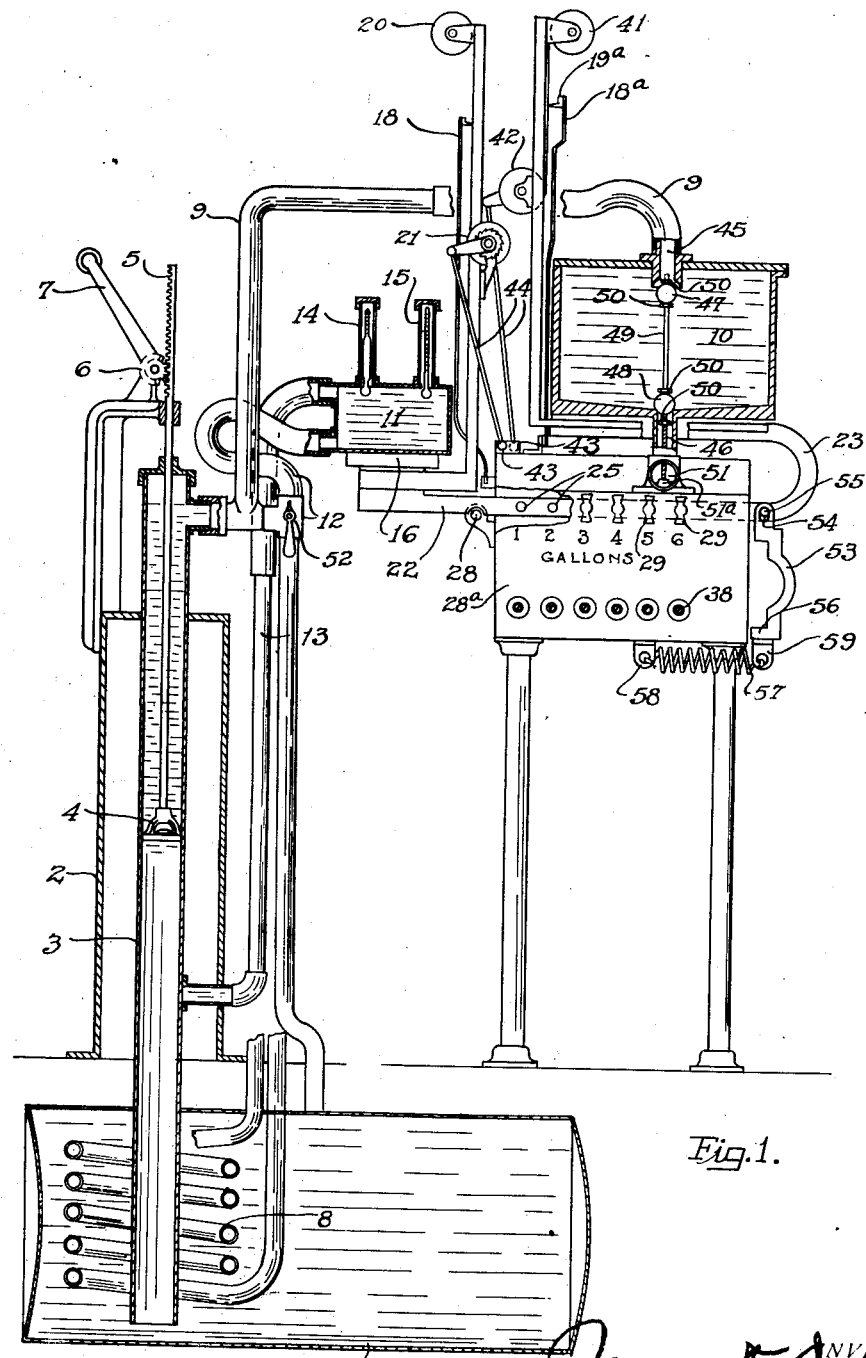
Fig. 1 is a side elevation, partly in section, of the complete apparatus.

The apparatus, as illustrated in the drawings, comprises the usual supply tank 1 to which a suitable pump is connected, here shown as a conventional type of liquid dispensing pump, consisting of a housing 2 in which is enclosed a casing 3, a piston 4 operable in the casing, a rack and pinion 5—6 and crank 7 for operating the piston.

The tank 1 is provided with means, as a water coil 8, for regulating the temperature of the liquid, thus to maintain its specific gravity at a predetermined point as will be best suited to the liquid for motor conditions.

The liquid is delivered from tank 1 through a discharge line 9 to a service tank 10, a United States Bureau of Standards gallon measure 11 also being supplied with liquid from tank 1 through a branch line 12 connected to line 9. The measure 11 is provided with an overflow return line 13 which serves to maintain the liquid in the measure at exact measure level.

The standard gallon measure 11 is provided with a hydrometer 14 and a thermometer 15 which serve respectively to indicate the specific gravity and the temperature of the liquid. The measure is supported on a standard scale 16 which serves to indicate the weight of the liquid in pounds avoirdupois per gallon on a graphic chart 17 by means of an indicator hand 18 having an inscriber 19 for marking the weight variations of the liquid on the tape 17 which is supplied from a roll 20 and transferred to a ratcheted take-up roll 21 as the readings are recorded automatically incident to the service operations of the apparatus.

The scale 16 has a beam 22 curved upwardly, as at 23, to afford a suitable support for the service gas tank 10, the liquid containers 10 and 11 being thus arranged to balance one with the other in variable relations on the scale according to the amount or weight of liquid to be dispensed on a given service to a customer. To effect the balance between containers 10 and 11 according to the weight of liquid to be delivered, scale beam 22 is provided with a series of pivot stops 24, best shown in detail Fig. 9, adapted to coact with a corresponding series of apertures 25 in the scale beam, the spacing of the stops, as here shown, being in exact scale ratio to effect variations of one gallon of liquid by weight between stops 24,—it being understood, of course, that fractional gallon variations can be obtained in like manner by arranging the stops in closer proximity one to another.

A detail of stops 24 is shown in Fig. 9, the parts consisting of the stop stem 24 having an outwardly extended push key 25, the stem being normally pressed outwardly by a compression spring 26 to a position free of the scale beam 22. In the position shown in Fig. 9, the stop is in full pivotal engagement with the scale beam and is adapted to be turned a quarter-turn to interlock the stop by means of a pin 27 with the outer casing member 28ª which is slotted as at 29 to permit pin 27 to pass through the casing in the axial movement of the stop, when the stop is turned to bring pin 27 into alignment with slot 29, thus to disengage the stop from the scale beam.

When none of the stops 24 are engaged with scale beam 22, the beam will be in pivotal engagement at 28 (see Fig. 1) and containers 10 and 11 will be normally at balance one with the other at that point when the weight measure 11 contains one gallon of liquid. It will be observed that the pivot bearing at 28 is open on the under side, thus the scale beam will be free to operate when the pivot center is changed to one of stops 24.

Associated with each stop 24 is a numeral type bar 29ª provided with a headed stem 30 and a compression spring 31, all operable in a sleeve 32, the type bars being adapted to be pushed forward by the inward movement of stops 24 to make an impression on double recording tapes 33—34 to record the number of gallons of gas delivered upon a selected setting of the scale by means of stops 24. Upon releasing and return to normal position of stops 24, springs 31 act to retract the type bars 29 to normal or non-registering position.

The recording tapes 33—34 are delivered from a series of supply rolls 35 and 36, the tapes from rolls 35 being delivered outside the case and adapted to be torn off and delivered to the customer as a receipt indicating the number of gallons of gas purchased, the tapes from rolls 36 being delivered to a corresponding series of take-up rolls 37, adapted to be actuated manually by outwardly projecting keys 38 having a worm gear connection 39 with the take-up roll. The provision for making impressions from type bars 29 on tapes 33—34 may consist of any suitable means, as inked ribbons or carbons, in a manner well known in recording devices of this character.

A visual indicator or graphic chart recorder 40, similar to the graphic recording chart 17, is also provided in connection with the service tank 10 to indicate and record the number of pounds of liquid dispensed, the indication and recording of the quantity being effected by a pointer 18ª and inscriber 19ª in the same manner as on the specific gravity recording device illustrated in Fig. 6, the recording tape being delivered from a roll 41 to a ratchet take-up roll 42, the take-up rolls 21 and 42 being connected to the scale beam 23, as at 43, by means of links 44. The standard gallon weighing measure 11 is adapted to indicate and record the weight of the liquid on chart 17 independently of scale beam 22, the weighing device being in effect a double indicating and recording scale constructed according to well known principles of devices of this character, the general showing of the arrangement in the drawings being more or less conventional.

The inlet and discharge ports 45—46 of service tank 10 may be controlled by any suitable valves, as the double ball valve 47—48 connected by a stem 49, the balls being adjustable on the stem relative to the valve seats by means of adjusting nuts 50, it being observed that limited free movement of lower ball 50 relative to stem 49 is provided to prevent a binding relation of the balls between the ports. A suitable discharge line, as the usual flexible hose may be connected at 51 to deliver the gas from container 10.

From the foregoing detailed description and the illustrations afforded by the drawings, the construction and operation of my improved liquid dispensing apparatus will be readily understood by those experienced in the art to which the invention pertains.

Gasoline is best adapted as a motor fuel at temperatures ranging from 45° to 60° Fahrenheit. Without means provided, as the water coil 8, the temperature of the liquid as dispensed from the common filling station will vary greatly above and below these limits and the gas will accordingly be rendered less effective. By means of the coil 8 cold water will be circulated through the coil to cool the liquid when the temperature is abnormally high and warm or hot water when the temperature is abnormally low, thus the gas can be kept at a mean temperature at which it is found to produce the best results as a power fuel.

In the operation of the apparatus, both containers 10 and 11 are normally empty; when the pump is operated the liquid is delivered into the weight measuring container 11 until it overflows through pipe 13, valve 52 is then closed which acts to direct the liquid through the upper course of line 9 into container 10, the particular stop 24 having been set in the meantime into operative relation with the scale beam 22 according to the weight, or number of gallons to be delivered. When the predetermined amount of liquid is delivered into container 10, the flow of liquid to the container will be stopped as the scale beam moves downwardly to the position where containers 10 and 11 will be in balanced relation one with the other, by the automatic action of the ball valve 47—48. As the scale beam approaches the limit of the downward movement, the lower end of valve stem 49 is brought into contact with a seat 51ᵃ (see Fig. 1) in post 51 which acts to stop the stem and thus, in the further downward movement of the container, to first close the intake port 45 as ball 47 engages its valve seat, and then to open the outlet port 46 as the valve seat recedes from ball 48, the interval of action between the valves being arranged by adjusting the lower nuts 50 on the valve stem to give lower ball 48 the required amount of free movement on the stem as best shown in Fig. 4. After the liquid has been drained from the container the valve is again adjusted automatically to the position illustrated in Fig. 4 by gravity action as the container rises with the scale beam to normal position.

With the downward movement of container 10, the recording inscriber 18ᵃ—19ᵃ is caused to traverse the face of the graphic chart 40 to record the weight of liquid delivered through the container, the instrumentalities for actuating the inscriber being best illustrated in Fig. 5, consisting of a pivoted finger 60 supported on casing 28ᵃ and connected pivotally to 18ᵃ by an extended link 61, engagement of the container being effected by means of a point contact 62, in a manner to register the extent of movement of finger 60 on chart 40. A similar arrangement is employed for actuating the inscribers 18—19 to register the specific gravity of the gas on chart 17, the detail features being here shown only in conventional form.

With the amount of liquid in container 10 to be delivered to the customer, the indicating device 17 will record the specific gravity, or pounds per gallon, of the liquid and indicator 40 will in like manner record the number of pounds of liquid delivered to container 10 to be served to the customer, the number of gallons having been marked on the corresponding tapes 33—34 upon setting of the selected stop 24. Operation of the scale beam incident to delivering of the liquid through container 10 will act through take-up rolls 21—42 to feed the graphic chart tapes 17 and 40 forward one step, unmarked portions of the charts being thus drawn forward for the next records. The tapes 33—34 coacting with the particular stop 24 are also drawn forward by manipulating the corresponding finger feeding device 38, the portion fed forward of one of the tapes being delivered outside the recording case for the customer.

It will be apparent from the described operation of the liquid weighing mechanism that containers 10 and 11 would be rendered out of balance one with the other immediately upon starting of the flow of liquid from container 10 to serve the customer and that questions might then arise whether the exact amount of liquid ordered was being delivered. To insure exact measurement to the customer, the scale beam is provided with a depending, spring-tensioned latch 53 connected to the scale beam by a slot 54 engaging a pin 55 set in the scale beam, a limited amount of free balancing movement of the scale beam being thus provided irrespective of the latching device 53. The lower end of the latch is provided with a shoulder 56 adapted to be drawn under the edge of the recording case by a spring 57 extended between a bracket 58 secured to the case and a downwardly extended portion 59 of the latch member 53. Thus when the required amount of liquid has been delivered into container 10 and the scale beam moves downward to a position where the containers 10 and 11 will be in full balance one with the other, the shoulder 56 will clear the lower edge of the register case and spring 57 will act to pull the shoulder 56 of the latch under the edge of the case, thus acting to hold the scale beam and with it container 10 in that position until the liquid has been drained from the container when the latch will be released by slight outward pressure being applied thereto.

It is contemplated in the prescribed use of the apparatus that the measuring container 11 should be drained after each serving of liquid from container 10, thus to insure that the liquid delivered to the customer is of the specific gravity indicated on chart 17. To drain container 11 valve 52 is opened which will cause the liquid to drain through pipe 9 into the storage tank 1, the steps of operation for refilling containers 10 and 11 to serve the next customer being as described.

It is common practice among motorists and to some extent with gasoline dealers to use a catalytic agent as tetraethyl lead, sold in a commercial compound known as "Boycite", especially for gasoline furnished to motorists, to render stale gas more active or volatile in a higher degree. The practice, however, is merely a make-shift means to an end, and lacks in large part a reliable basis upon which the state of the gas can be determined, or upon which any dependable degree of regularity can be maintained.

My invention provides a scientific basis upon which the state of the gas can be regulated and the state in which it is delivered to the customer can be accurately measured, thus affording a basis of accuracy, according to its full value, upon which the liquid can be dispensed.

Having described my invention, I claim:

1. A dispensing apparatus for liquid including in combination with a source of liquid supply, a container from which liquid is dispensed according to weight, means for delivering liquid from said source to said container, means associated with said container adapted to indicate the specific gravity of liquid delivered thereto, means rendered operable by a predetermined weight of liquid in the container for counterpoising the container and means operable by the movement of the container for controlling the supply of liquid to the container.

2. A dispensing apparatus for liquid including in combination with a supply tank, means for regulating the temperature of the liquid in said tank, means for delivering liquid from said source to said container, means associated with said container adapted to indicate the specific gravity of liquid delivered thereto, means rendered operable by a predetermined weight of liquid in the container for counterpoising the container and means operable by the movement of the container for controlling the supply of liquid to the container.

3. A dispensing apparatus for liquid including in combination with a source of liquid supply, a container from which liquid is dispensed according to weight, means for delivering liquid from said source to said container, means, as a standard of measure, for determining the specific gravity of liquid delivered to said container, means rendered operable by a predetermined weight of liquid in the container for counterpoising the container and means operable by the movement of the container for controlling the supply of liquid to the container.

4. A dispensing apparatus for liquid including in combination with a source of liquid supply, a container from which liquid is dispensed according to weight, means for delivering liquid from said source to said container, means for counterpoising the container, and means, comprising a standard of measure, for determining the specific gravity of liquid delivered to said container and adapted to coact with the movement of the container therewith in variable weight relations to determine the amount of liquid delivered thereto.

5. A dispensing apparatus for liquid including in combination with a source of liquid supply, a container from which liquid is dispensed according to weight, a supply line for delivering liquid from said source to said container, means for counterpoising the container means, as a standard measure including a hydrometer in the supply line interposed between the container and the liquid supply source for determining the specific gravity of the liquid delivered to the dispensing container, selective means adapted to effect a balanced relation between said measure and container and means coacting with the movement thereof to determine the quantity of liquid that will be delivered to the container.

6. A liquid dispensing apparatus including in combination a container for dispensing liquid according to weight, a standard container and means for determining the specific gravity of liquid, and means for effecting a weight ratio between said containers whereby to determine the exact weight measurement of liquid dispensed through said apparatus.

7. A liquid dispensing apparatus including in combination, a container for dispensing liquid according to weight, a standard container and means for determining the specific gravity of liquid, and means operable selectively for effecting a weight ratio between said containers whereby to determine the measurement of the liquid dispensed.

8. A liquid dispensing apparatus including in combination, a standard unit liquid measure, a multiple-unit liquid dispensing measure, and compensating means interposed between said measures for effecting a balanced weight relation therebetween whereby to weigh the liquid delivered through the dispensing measure.

9. A liquid dispensing apparatus including in combination, a standard unit liquid measure, a multiple unit liquid dispensing measure, and compensating means for effecting selectively a balanced relation between said measures whereby to predetermine the quantity of liquid delivered through the dispensing measure.

10. A liquid dispensing apparatus including in combination, a standard unit liquid measure and means associated therewith for recording the specific gravity of liquid, a multiple-unit liquid dispensing measure and means associated therewith for recording the weight of liquid, and means for effecting selectively a balanced relation between said measures whereby to predetermine the quantity of liquid delivered through the dispensing measure.

11. A liquid dispensing apparatus including a source of liquid supply and means associated with said source for regulating the specific gravity of the liquid, a standard unit liquid measure and means associated therewith for recording the specific gravity of liquid, a multiple-unit liquid dispensing measure and means associated therewith for recording the weight of liquid, and means for effecting selectively a balanced relation between said measures whereby to predetermine the quantity of liquid delivered through the dispensing measure.

12. A liquid dispensing apparatus including in combination, a standard unit liquid measure and means, as graphic charts, associated therewith for indicating and recording the specific gravity of liquid, a multiple-unit liquid dispensing measure and means, as graphic charts, associated therewith for indicating and recording the weight of liquid, and means for effecting a weight ratio between said containers whereby to determine the exact weight measurement of liquid dispensed through said apparatus.

13. A liquid dispensing apparatus including in combination, a standard unit liquid measure and a multiple-unit liquid dispensing measure supported in coactive relation one with the other on a balancing lever, as a scale beam, selective means for determining delivery of liquid to said measures in a predetermined ratio and to effect exact measurement of the liquid delivered through the dispensing measure and means coacting with the movement of said lever to determine the amount of liquid delivered to the dispensing measure.

14. A liquid dispensing apparatus including in combination, a standard unit liquid measure and a multiple-unit liquid dispensing measure supported in coactive relation one with the other on a balancing lever, as a scale beam, means for shifting the pivot center of said lever to effect a balanced relation between said measures and means coacting with the movement of said lever to determine the weight of liquid delivered to the dispensing measure.

15. A liquid dispensing apparatus including in combination, a standard unit liquid measure and a multiple-unit liquid dispensing measure supported in coactive relation one with the other on a balancing lever, as a scale beam, means coacting with the movement of said lever to determine the amount of liquid delivered to the dispensing measure, and selective means for shifting the pivot center of said lever to vary said amount.

In testimony whereof, I affix my signature.

JAMES K. DARBY.